(12) United States Patent
Robinson et al.

(10) Patent No.: US 10,557,601 B2
(45) Date of Patent: Feb. 11, 2020

(54) HALO LIGHTING UNIT

(71) Applicant: Disruptive Marketing Limited, Leeds (GB)

(72) Inventors: Adam Robinson, Huddersfield (GB); Peter Slevin, Holmfirth (GB); Paul Reynard, Keighley (GB)

(73) Assignee: Disruptive Marketing Limited, Leeds (GB)

(*) Notice: Subject to any disclaimer, the term of this patent is extended or adjusted under 35 U.S.C. 154(b) by 0 days.

(21) Appl. No.: 16/465,100

(22) PCT Filed: Nov. 30, 2017

(86) PCT No.: PCT/EP2017/081059
§ 371 (c)(1),
(2) Date: May 29, 2019

(87) PCT Pub. No.: WO2018/100104
PCT Pub. Date: Jun. 7, 2018

(65) Prior Publication Data
US 2019/0383451 A1 Dec. 19, 2019

(30) Foreign Application Priority Data

Dec. 2, 2016 (GB) .................................. 1620549.4
Mar. 15, 2017 (EP) .................................. 17161202

(51) Int. Cl.
*F21V 21/00* (2006.01)
*F21S 8/02* (2006.01)
(Continued)

(52) U.S. Cl.
CPC ............ *F21S 8/026* (2013.01); *G02B 6/0088* (2013.01); *F21Y 2103/33* (2016.08); *F21Y 2113/17* (2016.08); *F21Y 2115/10* (2016.08)

(58) Field of Classification Search
CPC .......... F21S 8/026; G02B 6/0088; F21V 8/00; F21V 13/02; F21Y 2113/17; F21Y 2103/33; F21Y 2115/10
(Continued)

(56) References Cited

U.S. PATENT DOCUMENTS 9,845,921 B2 * 12/2017 Van Bommel ............ F21V 5/04
2002/0075668 A1 * 6/2002 Dorrie ................... H01H 19/025
362/23.04
(Continued)

FOREIGN PATENT DOCUMENTS

DE 4312889 A1 10/1994
EP 2902693 A1 8/2015
(Continued)

OTHER PUBLICATIONS

International Preliminary Report on Patentability received for International Application No. PCT/EP2017/081059, dated Jun. 13, 2019, 6 pages.
(Continued)

*Primary Examiner* — Laura K Tso
(74) *Attorney, Agent, or Firm* — Spectrum IP Law Group LLC

(57) ABSTRACT

A light unit includes a housing having a central symmetry axis; a support located in the housing; a main lamp located axially on the support; and a multiplicity of secondary lamps located on the support and arranged in an array around the main lamp; a front casing defining a central aperture to which light from the main lamp passes to the exterior in use, the front casing preventing light from the secondary array from entering the central aperture; the front casing and housing defining a light guide channel; a light guide located in the channel, the light guide having a first end comprising a light inlet proximate the array of secondary lamps and a
(Continued)

second end comprising a light outlet proximate a periphery of the housing.

11 Claims, 7 Drawing Sheets

(51) Int. Cl.
*F21V 8/00* (2006.01)
*F21Y 103/33* (2016.01)
*F21Y 113/17* (2016.01)
*F21Y 115/10* (2016.01)

(58) Field of Classification Search
USPC ....... 362/612, 511, 565, 576, 580, 148, 150, 362/364, 216
See application file for complete search history.

(56) References Cited

U.S. PATENT DOCUMENTS

| | | | |
|---|---|---|---|
| 2004/0047161 A1* | 3/2004 | Mochizuki | F21S 43/14 362/511 |
| 2013/0051045 A1* | 2/2013 | Kay | B61D 29/00 362/478 |
| 2014/0078766 A1* | 3/2014 | Giametta | B60Q 1/0052 362/516 |
| 2015/0260905 A1 | 9/2015 | Yuan et al. | |
| 2015/0308868 A1* | 10/2015 | Henon | B60K 37/02 362/23.17 |
| 2016/0091170 A1* | 3/2016 | Watanabe | F21V 7/06 362/231 |
| 2016/0161073 A1* | 6/2016 | Grosdidier | B60Q 1/2696 362/511 |
| 2017/0321865 A1* | 11/2017 | Parker | F21V 7/0016 |

FOREIGN PATENT DOCUMENTS

| | | | |
|---|---|---|---|
| EP | 2016035253 | * | 8/2015 |
| EP | 3015761 A1 | | 5/2016 |
| EP | 3330593 A1 | | 6/2018 |
| GB | 2557278 A | | 6/2018 |
| WO | 2018100104 A1 | | 6/2018 |

OTHER PUBLICATIONS

International Search Report and Written Opinion received for International Application No. PCT/EP2017/081059, dated Feb. 20, 2018, 8 pages.

* cited by examiner

HALO LIGHTING UNIT

This application claims priority under 35 U.S.C. § 371 to International Application No. PCT/EP2017/081059 filed Nov. 30, 2017, entitled "HALO LIGHTING UNIT" which in turn claims priority of GB Application No. 1620549.4 filed on Dec. 2, 2016 and EP Application No. 17161202.1 filed on Mar. 15, 2017. The entire disclosure(s) of these documents are incorporated by reference herein for all purposes.

This invention relates to a lighting unit of the kind used to mount a lamp on a ceiling, wall, panel or other fixture, particular but not exclusively within a cavity formed in the fixture. In a typical application is the units may be received within a hole in a suspended ceiling or other fascia.

The lamp may comprise a LED lamp array. Alternative embodiments may employ halogen bulbs, OLED lamps or incandescent lamps.

Recessed LED lights, commonly known as LED downlights are widely known. Typically a LED downlight fixture comprises an array of LEDs in thermal connectivity with a heat sink, the array of LEDs being positioned adjacent a first aperture of a reflector assembly. A diffuser may be positioned proximal to and extending across a second aperture. Due to the arrangement and directional nature of LED components, these light units project light vertically downwards in a narrow beam angle with essentially no diffusion in a horizontal direction.

Spotlights may include light scattering components disposed either directly at the bottom of a lamp reflector or within a certain distance from it in order to evenly illuminate a surrounding area. Examples are DE 2121074, DE 3633976 and DE 3737324. These systems rely on redirection of light created by a primary light source. This limits the colour and brightness of the created ambient light to that of the primary light. DE 9104995 discloses an arrangement wherein a light directing component is coloured to subsequently change the colour of the ambient light. Such a system limits the ambient light to a single colour and requires manual changing of the diffuser component.

According to the present invention a light unit comprises a housing having a central symmetry axis;
   a support located in the housing;
   a main lamp located axially on the support; and
   a multiplicity of secondary lamps located on the support and arranged in an array around the main lamp;
   a front casing defining a central aperture to which light from the main lamp passes to the exterior in use, the front casing preventing light from the secondary array from entering the central aperture;
   the front casing and housing defining a light guide channel;
   a light guide located in the channel, the light guide having a first end comprising a light inlet proximate the array of secondary lamps and a second end comprising a light outlet proximate a periphery of the housing.

The present invention provides a downlight, preferably an LED downlight which has a secondary peripheral light source. This may direct light horizontally, preferably throughout an angle of 360° from the light fixture in order evenly illuminate the mounting surface.

The light guide may, in use, deflect light from a direction parallel to the central axis at the light inlet to a direction away from the central axis at the light outlet.

The light outlet may be located in a plane normal to the central axis.

The light guide may be rotationally symmetrical about the central symmetry axis. The light guide may be circular. Alternatively the light guide may be oval or may have n-fold symmetry, wherein n is an integer, about the central axis.

The light guide outlet may be directed radially outwardly of the housing.

The light guide may be annular or toroidal having a first portion extending axially from the light inlet and a second portion extending radially to the light outlet. The light guide may be generally L-shaped in cross section.

An annular collar may be located over the light guide channel, the collar having an axial aperture communicating with the central aperture and the collar overlying the light guide in order to restrict egress of light to the circumferential or peripheral outlet.

The light guide may be composed of an acrylic polymer or other high refractive index material wherein the refractive index is selected so as to achieve total internal reflection of light passing from the light inlet to the light outlet.

The inner and outer annular surfaces of the light guide may be frosted or textured to optimise internal reflection.

Texturing or frosting of the annular surfaces improves dispersion of light by internal reflection within the light guide. This has the beneficial result in making the lamination emitted from the outlet surface to be more uniform to create a more even dispersion of light across the surface of the fascia on which the unit is mounted.

The frosting may provide an unpolished or matt appearance and may be achieved by not polishing the guide after removal from a mould. The moulded guide may be sandblasted to remove tooling marks but not subsequently polished. The provision of a frosted surface has the advantage of reducing manufacturing costs as well as improving light dispersion across the fascia surface.

The radius of the surface facing towards the central axis may have a maximum value having a central radius curving from the light inlet towards the outer flange surface, in order to optimise total internal reflection in use. The width in a radial direction of the light inlet is greater than the width in the axial direction of the outlet in order to concentrate the light beam as it passes from the inlet to the outlet.

One or both of the inlet and outlet surfaces of the light guide may be textured to increase uniform and efficient transmission of light from the outlet. Both of the inlet and outlet surfaces are preferably not textured or frosted and are preferably polished to mirror finish.

A main LED may provide a full range of white light colour using a LED driver circuit assembly and a dual colour LED chip of 2700K (commonly referred to as 3000K) and 6500K (commonly referred to as 6000K). Mixing of these two colours via the driver's circuit assembly provides a colour contrast temperature (CCT) adjustable from 2700K to 6500K.

The secondary lamps comprise in an exemplary embodiment by a circular array of 16 LED chips with a total power of 2 W. All are Red/Blue/Green RBG or alternating 2700K and 6500K LEDs.

The primary light brightness may be controlled by increasing the power from 0 to 10 W. The secondary light brightness may be controlled by increasing the power from 0 to 2 W, this power being distributed across all 16 LED chips.

A lens may be located in the central aperture in order to focus or collimate the main light beam.

The primary and secondary lights may be independently or jointly controlled to change their colour and brightness.

Peripheral lighting is achieved in a preferred embodiment by 16 low powered LED chips that are mounted in a ring around the main LED chip. The chips may be positioned to point directly downwards parallel to the central axis. This has the advantage of minimising product depth, maintaining similar aesthetic appearance to a standard downlight assembly. Simplified construction is achieved. Peripheral lighting using the light guide which in a preferred embodiment has a toroidal configuration and is L-shaped in cross section.

Remote control may be provided using computer software or a smart device application. Commands from the software or device may be communicated to individual lights or to groups of lights by wireless communication methods such as Bluetooth or WiFi. However signals may also be sent through the mains power supply.

A heat sink may be located in thermally conductive communication with the support. The heat sink may be located in contact with a rear surface of the support, so that the heat sink conducts heat directly from the main and secondary LEDs in use.

Use of a light unit in accordance with the following invention provides many benefits including the following benefits.

1. remote control of the lights including on/off, colour and brightness control;
2. individual and group control of the lights;
3. ability to have either main lighting or ambient lighting only or both from a single unit; and
4. minimal product aesthetics with minimum product extension from the plane of the mounting surface.

The unit of the present invention is advantageous in relation to arrangement in which a ring of LED chips is located around the external surface of a typical LED downlight. In the latter case substantial unevenness or spotting of light would occur. In addition the placement of the LED chips around the external surface necessitate an undesirable protrusion of the product from the mounting surface of perhaps to a height of 15 mm. The internal placement of the LED chips in vertical orientation for a downlight, combined with redirection of light using a light guide achieves superior diffusion and greatly reduces the appearance of spotting. Furthermore the unit has a minimum protrusion from a mounting fascia. Furthermore location of the main and secondary LEDs on the support allows direct connection of the peripheral chips to the heat sink in order to improve cooling performance.

The invention is further described by means of example but not in any limitative sense with reference to the accompanying drawings of which:

The same reference numerals are used to denote like components in each of the Figures.

Figure 1:
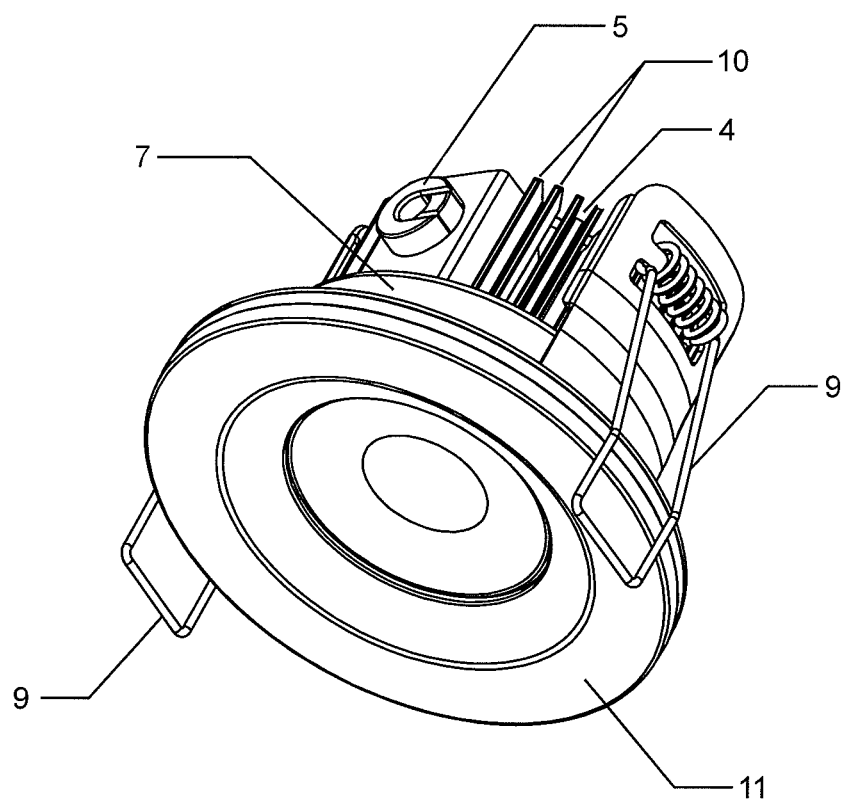
FIG. 1 is a perspective view of a light unit in accordance with this invention.
Figure 2:
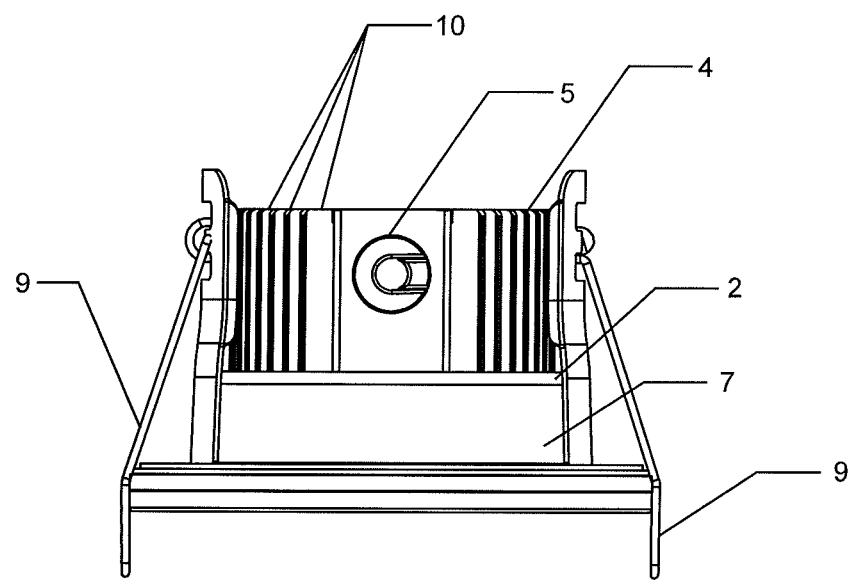
FIG. 2 is a side elevation of the unit shown in FIG. 1.
Figure 3:
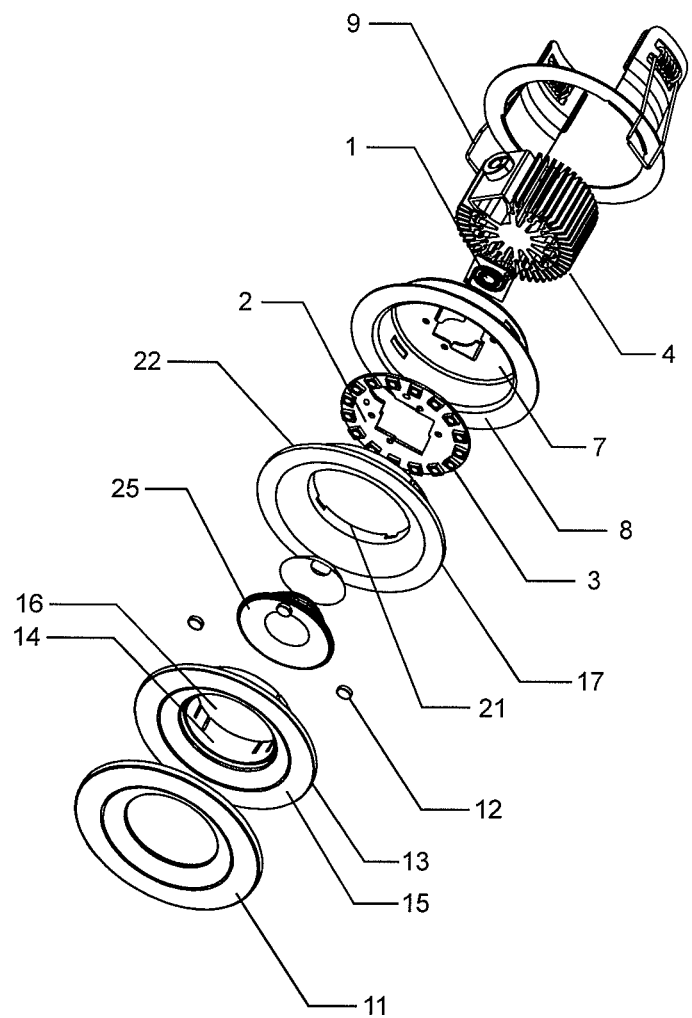
FIG. 3 is an exploded view of the unit.
Figure 4:
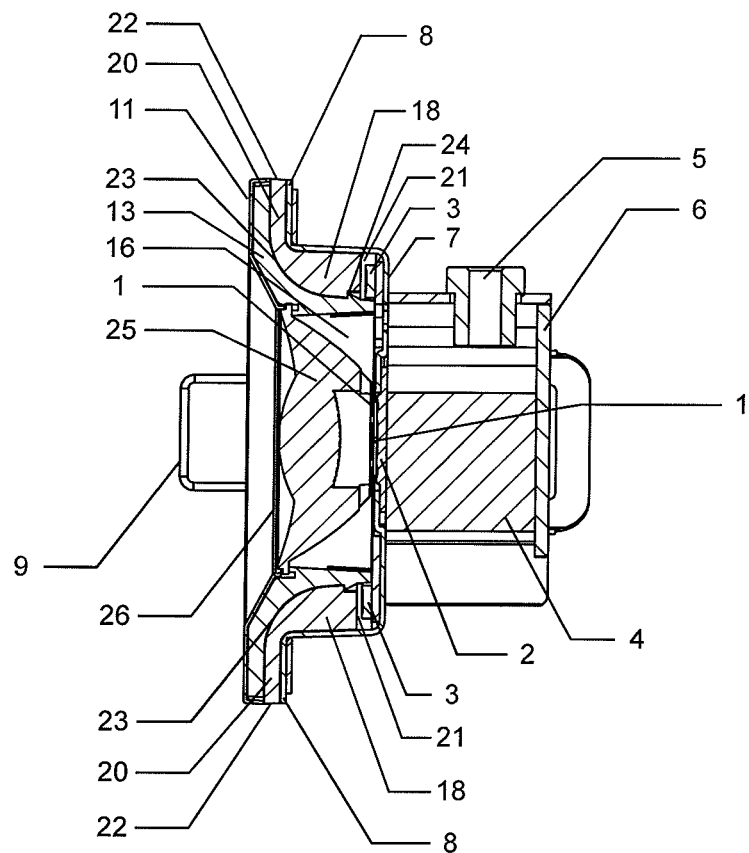
FIG. 4 is a cross sectional view through the unit.

The light unit shown in the Figures comprises a main LED chip (1) mounted centrally on a support (2) located in a cylindrical housing (7).

A multiplicity of secondary LED lamp chips (3) are mounted on the support (2) in a circular array. A heat sink (4) having cooling fins (10) is mounted on the rear surface of the support and provides cooling for both the main and secondary LED chips. A guide (5) for a power supply cable is provided in the back casing (6).

The housing (7) has a central axis of symmetry and includes a circumferential flange (8). The housing is arranged to fit into an aperture in a ceiling panel or other fascia (not shown) with the flange overlying the surface of the fascia to conceal the aperture.

The unit is secured to the fascia by means of two spring clips (9) a decorative bezel (11) is secured to the collar by magnets (12).

Front casing (13) has a cylindrical rear portion (14) and a radially outwardly extending annular flange (15). The rear portion defines an axial cylindrical central aperture (16) within which the main LED chip is axially located. The circular array of secondary LED chips (3) are located radially outwardly of the rear portion. The rear portion contacts the support so that light from the secondary array cannot enter the central aperture to mix with light from the main lamp. Further light from the main lamp cannot pass outwardly to mix with light from the secondary array.

The housing (7) and front casing (13) define a light guide cavity occupied by light guide (17).

Figure 5:
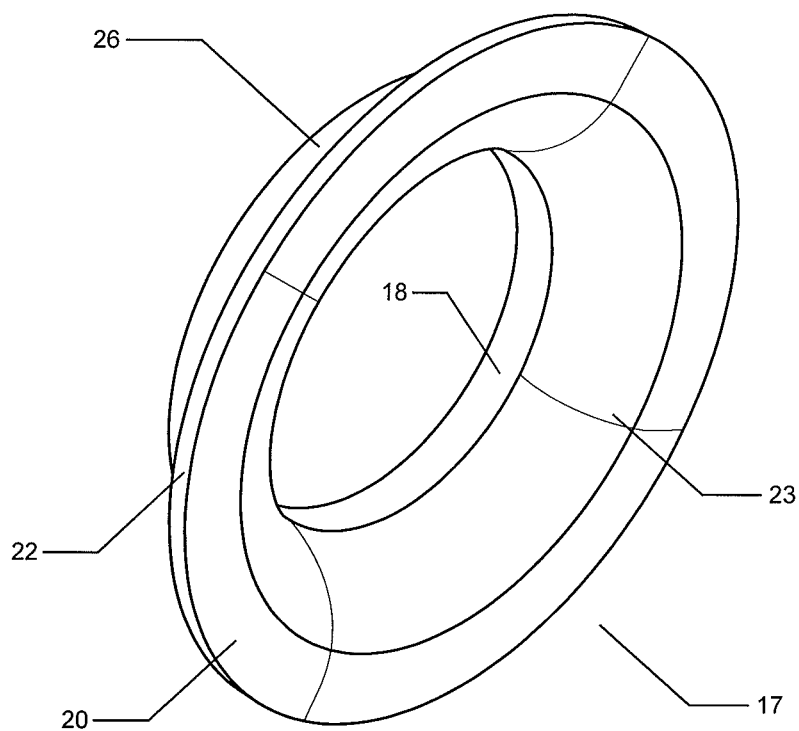
FIGS. 5 and 6 are perspective views of the light guide of the unit.
Figure 6:
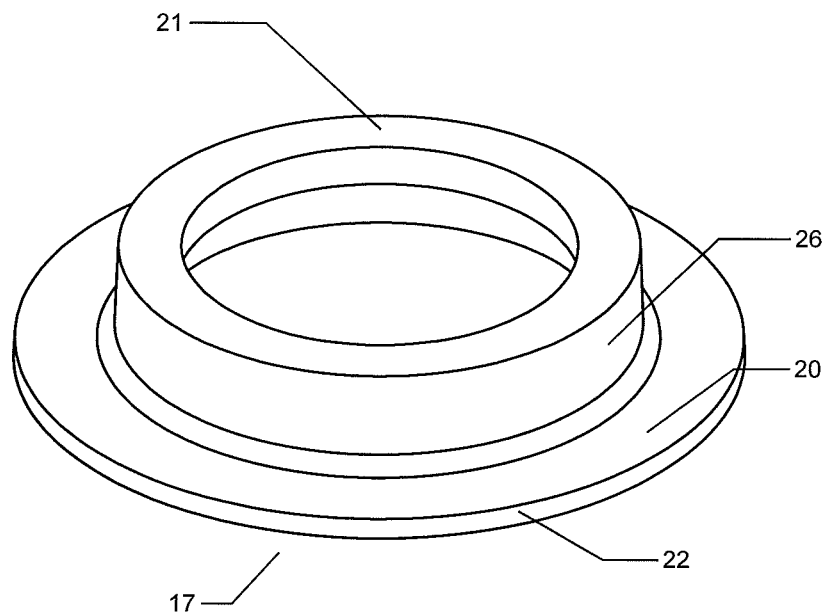
Figure 7:
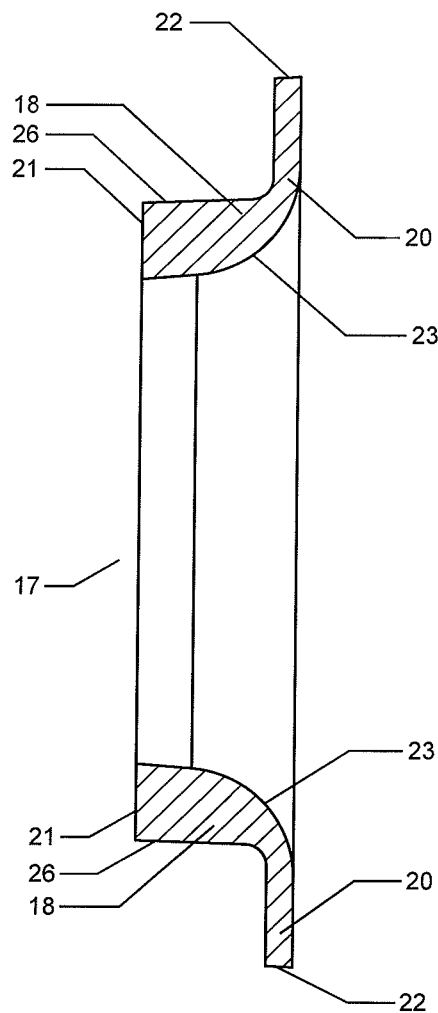
FIG. 7 is a cross sectional view of the light guide.

The light guide (17) is shown in greater detail in FIGS. 5 to 7 and comprises an annular or toroidal structure formed from acrylic polymeric resin. The structure comprises a first generally cylindrical annular portion (18) having a planar radially extending annular light inlet surface (21) arranged to be located proximate to the light emitting portions of the LEDs of the secondary array. The light inlet surface (21) may be located in contact with the LEDs or may be arranged in proximate spaced relation to the LEDs.

The light guide has a radially outwardly extending flange portion (20) and a cylindrical outermost light outlet surface (22). The surface of the light outlet (22) extends coaxially with the central axis of symmetry of the unit.

The inlet (21) and outlet (22) surfaces are polished to a mirror-like smooth finish.

The radially inner surface (23) extends in a smooth curve having a maximum radius from the light inlet (21) to the flange portion (20) in an axial direction towards the outward radial direction parallel to the fascia surface leading to the light outlet (22). The outer surface (26) has a stepped configuration to allow the guide to be accurately located within the back casing (8) in contact with the overlying flange (19) overlying the fascia surface.

The inner (23) and outer (26) surfaces have a matt or unpolished texture to provide a frosted appearance in order to enhance scattering of light by internal reflection within the guide. The inlet surface (21) has a greater area than the outlet surface (22) so that a beam of light passing from the inlet to the outlet is concentrated to provide more intense illumination of the fascia surface adjacent the guide.

This arrangement optimises total internal reflection by light passing from the light inlet to the light outlet. The width of the annular portion (18) in a radial direction with respect to the central axis is greater than the width of the flange portion in the axial direction with respect to the central axis in order to concentrate the light beam passing from the inlet to the outlet.

A lug (24) on the rear end of front casing (13) is received in a correspondingly shaped rebate in the light guide in order to securely engage the casing to the guide.

A lens (25) is engaged within the central aperture (16) and is protected by an overlying window (26).

The light inlet (21) and outlet (22) surfaces of the light guide are polished in order to enhance uniform transmission of light emitted by the light outlet. This serves to reduce uneven illumination or spotting of the fascia surface.

The unit of the present invention provides a homogeneous and brightly illuminated halo effect on the ceiling or other fascia around the light unit.

The invention claimed is:

1. A light unit, comprising:
    a housing having a central symmetry axis;
    a support located in the housing;
    a main lamp located axially on the support; and
    a multiplicity of secondary lamps located on the support and arranged in an array around the main lamp;
    a front casing defining a central aperture to which light from the main lamp passes to the exterior in use, the front casing preventing light from the secondary array from entering the central aperture;
    the front casing and housing defining a light guide channel;
    a light guide located in the channel, the light guide having a first end comprising a light inlet proximate the array of secondary lamps and a second end comprising a light outlet proximate a periphery of the housing.

2. A light unit as claimed in claim 1, wherein the light guide configured to deflect light from a direction parallel to the central axis at the light inlet to a direction away from the central axis at the light outlet.

3. A light unit as claimed in claim 2, wherein the light outlet is located in a plain normal to central axis.

4. A light unit as claimed in claim 1, wherein the light guide is rotationally symmetrical about the central symmetry axis.

5. A light unit as claimed in claim 4, wherein the light guide outlet is directed radially outwardly of the housing.

6. A light unit as claimed in claim 1, wherein the light guide is annular having a first portion extending axially from the light inlet and a second portion extending radially to the light outlet.

7. A light unit as claimed in claim 1, further comprising an annular collar located above the light guide channel, the collar having an axial aperture communicating with the central aperture and the collar overlying the light guide.

8. A light unit as claimed in claim 1, wherein the light guide is composed of acrylic polymer.

9. A light unit as claimed in claim 1, wherein the inlet and outlet surfaces of the light guide are polished and the radially inner surface is textured.

10. A light unit as claimed in claim 1, wherein the main LED has a dual colour of 2700K and 6500K.

11. A light unit as claimed in claim 1, wherein the secondary lamps provide a circular array of RBG or alternating 2700K and 6500K LEDs.

* * * * *